(12) United States Patent
Mitomo et al.

(10) Patent No.: US 6,601,610 B1
(45) Date of Patent: Aug. 5, 2003

(54) CHANGEOVER VALVE AND GAS TRANSPORTATION PIPE SYSTEM

(75) Inventors: Seiki Mitomo, Chiyoda-ku (JP); Yukio Fukushima, Chiyoda-ku (JP); Masaaki Miyamoto, Chiyoda-ku (JP); Shoken Takahashi, Matudo (JP)

(73) Assignee: Hitachi Plant Engineering & Construction Co., Ltd., Tokyo (JP)

( * ) Notice: Subject to any disclaimer, the term of this patent is extended or adjusted under 35 U.S.C. 154(b) by 66 days.

(21) Appl. No.: 10/043,185

(22) Filed: Jan. 14, 2002

(51) Int. Cl.$^7$ .............................................. F16K 11/07
(52) U.S. Cl. .................... 137/625.47; 137/874
(58) Field of Search ............................ 137/625.47, 874

(56) References Cited

U.S. PATENT DOCUMENTS

| | | | | |
|---|---|---|---|---|
| 1,725,337 A | * | 8/1929 | Burkhead | 137/625.47 |
| 3,489,178 A | * | 1/1970 | Kice | 137/624.41 |
| 4,449,863 A | * | 5/1984 | Ullner | 406/182 |
| 4,909,273 A | * | 3/1990 | Heep et al. | 137/240 |
| 4,952,100 A | * | 8/1990 | Heep et al. | 406/182 |
| 5,072,758 A | * | 12/1991 | Krambrock | 137/625.47 |
| 5,129,459 A | * | 7/1992 | Breese et al. | 166/339 |
| 6,240,941 B1 | * | 6/2001 | Small et al. | 137/1 |

FOREIGN PATENT DOCUMENTS

| | | |
|---|---|---|
| JP | 52-20582 | 2/1977 |
| JP | A 2-56255 | 2/1990 |
| JP | A 7-330151 | 12/1995 |

* cited by examiner

*Primary Examiner*—John Fox
(74) *Attorney, Agent, or Firm*—Oliff & Berridge, PLC (57) ABSTRACT

It is an object of the present invention to provide a changeover valve which is capable of preventing granular material from being crushed when the granular material is transported by gas through a pipe system, and more particularly a changeover valve which is capable of preventing grain from being crushed, broken, and chipped when the grain such as rice is transported by gas through the pipe system. It is another object of the present invention to provide a gas transportation pipe system for grain to which the changeover valve is applied. The changeover valve according to the present invention comprises: a valve disc in a cylinder shape including on a side part thereof a through passage which is connected to transportation passages on an upstream side and a downstream side and which is in an eccentric position deviated from a center of the cylinder; a casing for rotatably accommodating the valve disc therein; and a pair of discharge passages which are provided in the casing and connected to the through passage of the valve disc, and an inside diameter of an introducing passage of the changeover valve at an output end thereof is smaller than an inside diameter of the through passage of the valve disc and an inside diameter of the introducing passage in an output side part has a shape gradually decreasing in size toward the downstream side while an inside diameter of each of the pair of the discharge passages at an input end thereof is larger than the inside diameter of the through passage of the valve disc and an inside diameter of each of the pair of the discharge passages in an input side part has al shape gradually increasing in size toward the upstream side.

11 Claims, 9 Drawing Sheets

CHANGEOVER VALVE AND GAS TRANSPORTATION PIPE SYSTEM

BACKGROUND OF THE INVENTION

1. Field of the Invention

The present invention relates to a changeover valve and a gas transportation pipe system for grain to which the changeover valve is applied. The changeover valve is particularly appropriate to be used for a pipe system for transporting grain such as rice and other granular material by introducing compressed air into pipes.

2. Description of Related Art

Conventionally, in rice polishing factories and boiled rice factories, transportation apparatuses such as bucket conveyers, lifts, horizontal belt conveyors and the like are usually used for transporting delivered rice, which is granular material, among equipment.

However, buckets, belts, driving motors and so on are required when the above-mentioned transportation apparatuses are used, which results in upsizing of the transportation apparatuses and brings about great difficulty in assembly and installation thereof. Furthermore, since rice bran remains in gap parts of the conveyors in the transportation apparatuses, microbes such as mold may grow to gather insects and so on eating the mold. This brings about a problem that values of rice and boiled rice as products may possibly be lost. Since the transportation apparatuses need to be frequently disassembled for cleaning in order to eliminate the problem, a problem is further caused that maintenance cost is increased.

Figure 11:
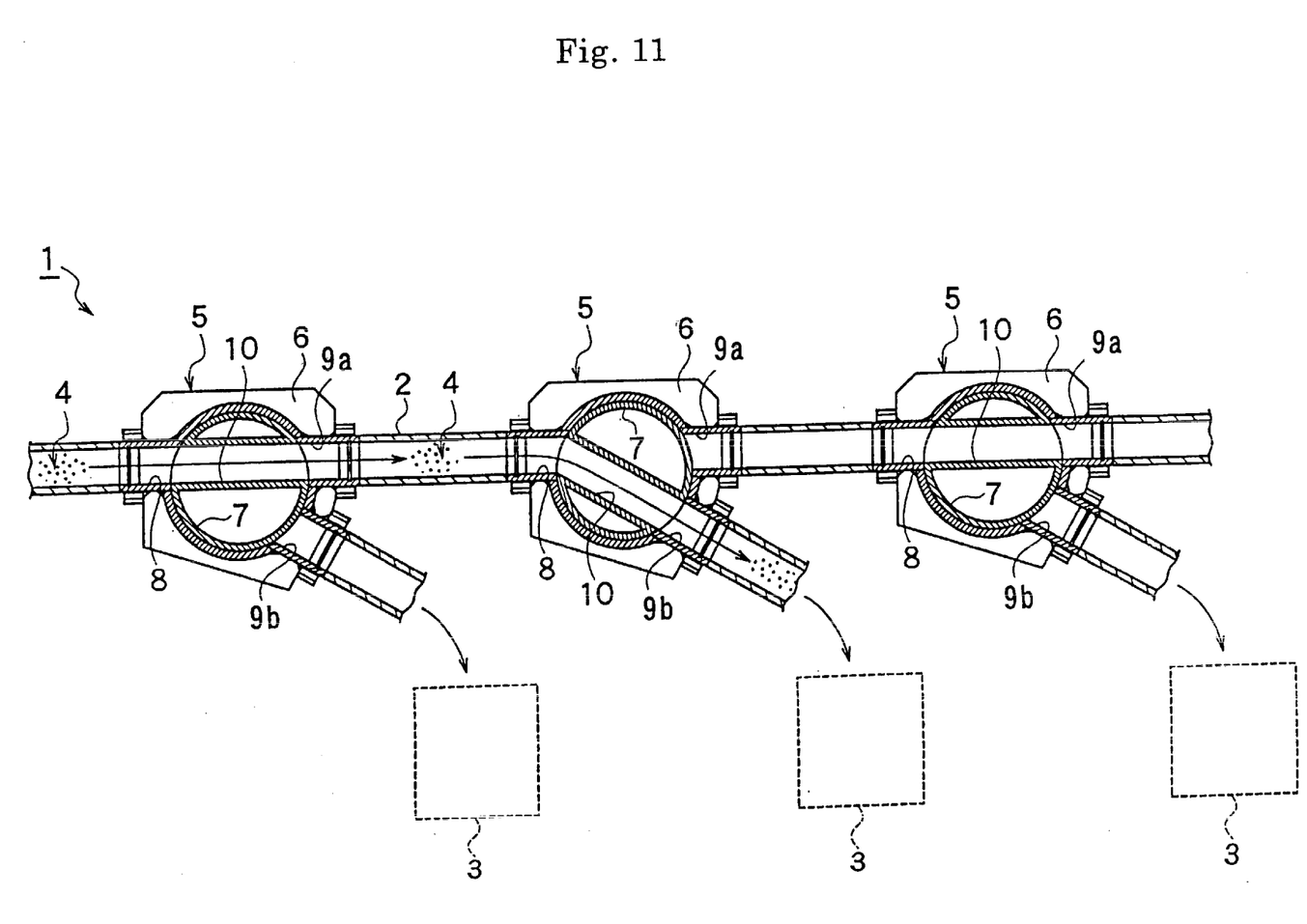
FIG. 11 is a sectional view of an end part of a conventional transportation pipe system.

As methods to solve these problems, methods of transporting rice with the use of air are known as are disclosed in Japanese Patent Laid-open No. Hei 7-330151, Japanese Patent Laid-open No. Hei 2-56255, and Japanese Patent Laid-open No. Sho 52-20582. In these methods, rice is transported by air streams which are generated in pipes by blowers and compressors. The use of such pneumatic transportation methods makes it possible to avoid the problem that the rice bran remains halfway in the pipes since the rice and the air are transported in the pipes which are shielded from the outside. FIG. 11 is a sectional view of a part on an end side of a gas transportation pipe system in a conventional transportation apparatus 1 for rice.

As is shown in FIG. 11, in the end side part of the transportation apparatus 1 which utilizes an air stream, a plurality of storage tanks 3 are installed below a pneumatic transportation pipe 2 and each of changeover valves 5 enables rice 4 which is transported through the pneumatic transportation pipe 2 to be accommodated in a specific one of the storage tanks 3.

Each of the changeover valves 5 is composed of a casing 6 and a valve disc 7 which is rotatably accommodated in the casing 6, and a lead-out angle to the storage tank 3 relative to the pneumatic transportation pipe 2 is set at a small value as shown in FIG. 11. This prevents the rice 4 transferred at a high speed from being crushed even when the rice 4 collides with inner walls of the changeover valves 5 since a collision angle is small.

However, the above conventional changeover valve 5 has a problem as described below.

Figure 12:
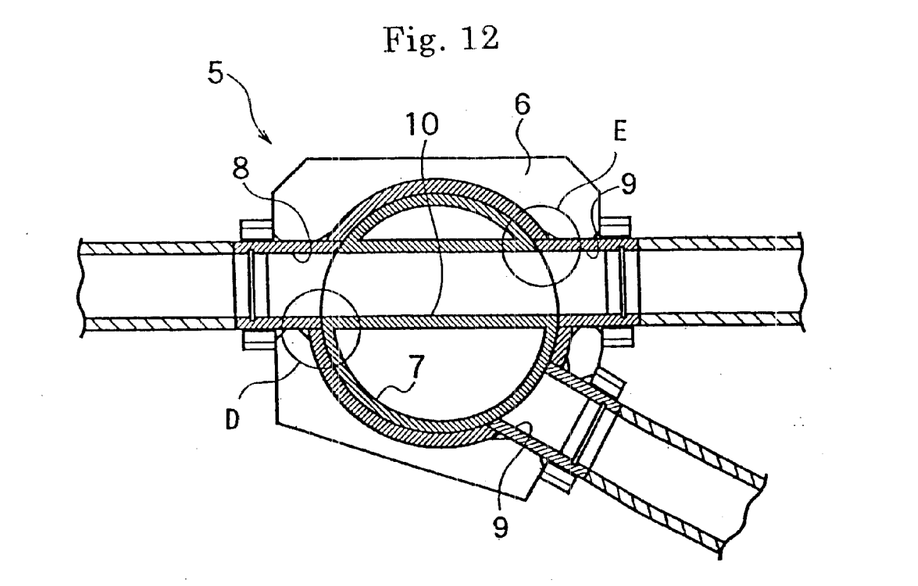
FIG. 12 is a sectional view of a conventional changeover valve.
Figure 13:
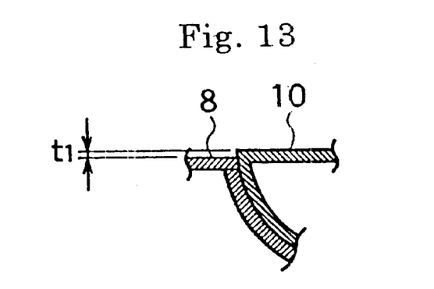
FIG. 13 is an enlarged view of the part D of the conventional changeover valve in FIG. 12.
Figure 14:
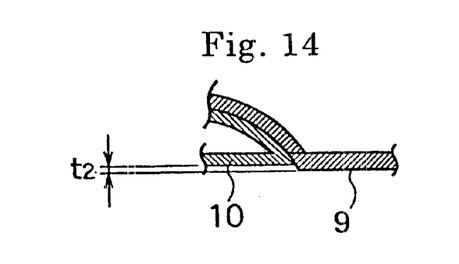
FIG. 14 is an enlarged view of the part E of the conventional changeover valve in FIG. 12.

FIGS. 12 to 14 are sectional views of the conventional changeover valve 5, FIG. 12 being a sectional view of the changeover valve 5, FIG. 13 being an enlarged view of the part D in FIG. 12, and FIG. 14 being an enlarged view of the part E in FIG. 12.

As is shown in these drawings, the conventional changeover valve 5 is composed of the casing 6 and the valve disc 7, and the rotation of the valve disc 7 causes an introducing passage 8 and a discharge passage 9a or 9b which are formed in the casing 6 to be connected to a through passage 10 which is formed in the valve disc 7 to pass the rice 4 therethrough. However, the casing 6 and the valve, disc 7 are separate bodies so that differences in inside diameters between the introducing passage 8 and the through passage 10 and between the discharge passage 9a or 9b and the through passage 10 may be sometimes caused through mechanical processes and the rice 4 may possibly be crushed when it collides with stepped parts, which are designated by the sizes $t_1$ and $t_2$, as shown in FIG. 12 and FIG. 13.

It is an object of the present invention to eliminate these problems and to provide a changeover valve which is capable of preventing granular material from being crushed when the granular material is transported by gas through a pipe system, and more particularly, a changeover valve which is capable of preventing grain such as rice from being crushed, cracked, broken, and chipped when grain such as rice is transported by gas through the pipe system. It is another object of the present invention to provide a gas transportation pipe system for grain such as rice to which the changeover valve is applied.

SUMMARY OF THE INVENTION

A changeover valve according to the present invention is a changeover valve comprising: a valve disc in a cylinder shape including on a side part thereof a through passage which is connected to transportation passages on an upstream side and a downstream side and which is in an eccentric position deviated from a center of the cylinder; a casing for rotatably accommodating the valve disc therein; and a pair of discharge passages which are provided in the casing and connected to the through passage of the valve disc, wherein an inside diameter of an introducing passage of the changeover valve at an output end thereof is smaller than an inside diameter of the through passage of the valve disc and an inside diameter of the introducing passage in an output side part has a shape gradually decreasing in size toward the downstream side while an inside diameter of each of the pair of the discharge passages at an input end thereof is larger than the inside diameter of the through passage of the valve disc and an inside diameter of each of the pair of the discharge passages in an input side part has a shape gradually increasing in size toward the upstream side. It is also appropriate that the shape of the inside diameter of the introducing passage in the output side part thereof, which is gradually decreasing in size toward the downstream side, is a slope. It is also appropriate that the shape of the inside diameter of each of the pair of the discharge passages in the input side part thereof, which is increasing in size toward the upstream side, is in an arc shape.

Another changeover valve for a gas transportation pipe system for grain according to the present invention is a changeover valve comprising: a valve disc in a cylinder shape including on a side part thereof a through passage which is connected to transportation passages on an upstream side and a downstream side and which is in an eccentric position deviated from a center of the cylinder; a casing for rotatably accommodating the valve disc therein; and a pair of discharge passages which are provided in the casing and connected to the through passage of the valve disc, wherein an inside diameter of an introducing passage of the changeover valve at an output end thereof is smaller than an inside diameter of the through passage of the valve disc and a diameter-reducing slope is formed in an output side part of the introducing passage with an inclination angle thereof equal to 30 degrees or less while an inside diameter of each of the pair of the discharge passages at an input end thereof is larger than the inside diameter of the through passage of the valve disc and an inside diameter of each of the pair of the discharge passages in an input side part has a shape gradually increasing in size toward the upstream side. It is also appropriate that the shape of the inside diameter of each of the discharge passages in the input side part thereof, which is increasing in size toward the upstream side, is in an arc shape.

A gas transportation pipe system for grain according to the present invention comprises a changeover valve comprising: a valve disc in a cylinder shape including on a side part thereof a through passage which is connected to transportation passages on an upstream side and a downstream side and which is in an eccentric position deviated from a center of the cylinder; a casing for rotatably accommodating the valve disc therein; and a pair of discharge passages which are provided in the casing and connected to the through passage of the valve disc, wherein the changeover valve is structured in a manner in which an inside diameter of an introducing passage of the changeover valve at an output end thereof is smaller than an inside diameter of the through passage of the valve disc and an inside diameter of the introducing passage in an output side part has a shape gradually decreasing in size toward the downstream side while an inside diameter of each of the pair of the discharge passages at an input end thereof is larger than the inside diameter of the through passage of the valve disc and an inside diameter of each of the pair of the discharge passages in an input side part has a shape gradually increasing in size toward the upstream side and an angle made by center axes of the pair of the discharge passages is set at a value equal to 30 degrees or less, and wherein the through passage and an upper one of the discharge passages are coaxially connected to a main transportation pipe of the gas transportation pipe system for grain and a lower one of the discharge passages is connected to a branching pipe of the gas transportation pipe system for grain. It is also appropriate that the shape of the inside diameter of the introducing passage in the output side part thereof, which is gradually decreasing in size toward the downstream side, is a slope. It is also appropriate that an angle of the slope is 30 degrees or less. It is also appropriate that the shape of the inside diameter of each of the pair of the discharge passages in the input side part thereof, which is increasing in size toward the upstream side, is in an arc shape.

DETAILED DESCRIPTION OF THE PREFERRED EMBODIMENTS

A preferred embodiment of a changeover valve 28 according to the present invention is explained in detail below.

Figure 1:
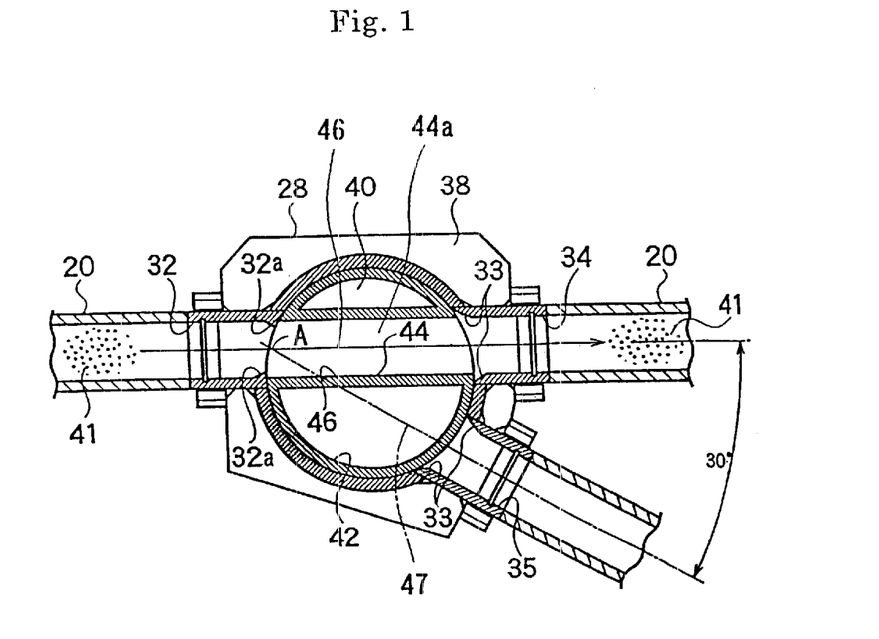
FIG. 1 is a sectional view of a changeover valve according to the present invention.
Figure 2:
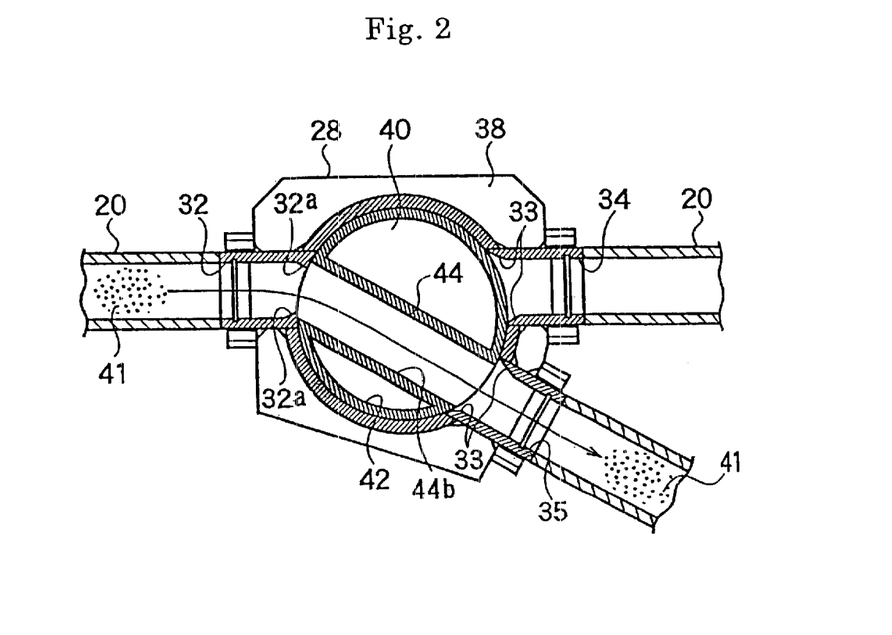
FIG. 2 is a sectional view of the changeover valve according to the present invention.
Figure 3:
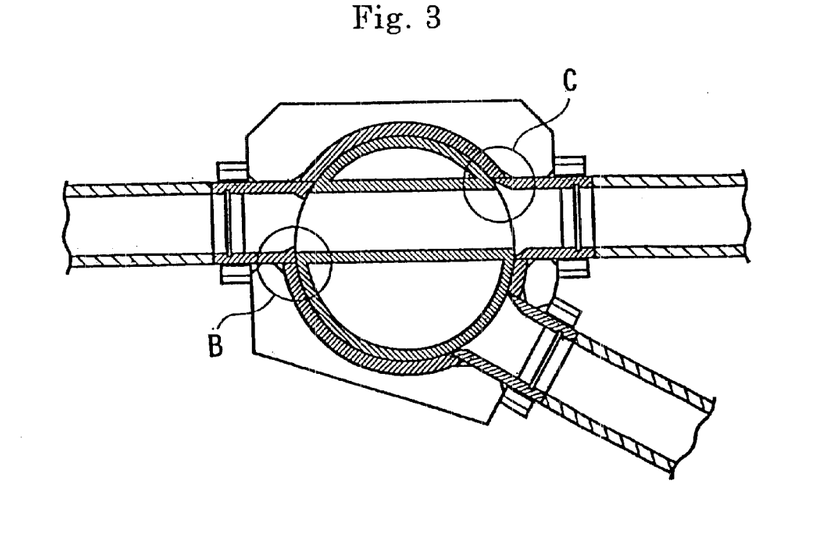
FIG. 3 is a sectional view of the changeover valve according to the present invention.

FIG. 1 and FIG. 2 are sectional views of the changeover valve 28 according to the present invention. The changeover valve 28 includes an introducing passage 32, a first discharge passage 34, and a second discharge passage 35 as shown in FIG. 1 and FIG. 2 so that the changeover operation of the changeover valve 28 causes the gas stream which is introduced from the introducing passage 32 to be discharged from the first discharge passage 34 or the second discharge passage 35.

The above-described changeover valve 28 is composed of a casing 38 which constitutes the changeover valve body and a valve disc 40 in a cylindrical shape which is rotatably accommodated in the casing 38. The casing 38, which constitutes the changeover valve body, has a valve disc accommodating part 42 formed in a center part thereof to rotatably hold the cylindrical shaped valve disc 40 therein.

A through passage 44 for connecting the introducing passage 32 to the first discharge passage 34 or the second discharge passage 35 is formed to extend from a side part of the casing 38 and to pass through the valve disc 40. And the through passage 44 is located in an eccentric position deviated from a center of the valve disk 40. A rotary shaft is provided in a center axis of the valve disc 40, and the valve disk 40 is structured to be rotatable when the rotary shaft is rotated by a driving apparatus such as an air cylinder (not shown). By the rotation of the valve disc 40, the through passage 44 is connected linearly to the first discharge passage 34 to constitute a first passage 44a as shown in FIG. 1 or connected to the second discharge passage 35 in a manner the second discharge passage 35 in a branching off manner to constitute a second passage 44b as shown in FIG. 2.

Figure 4:
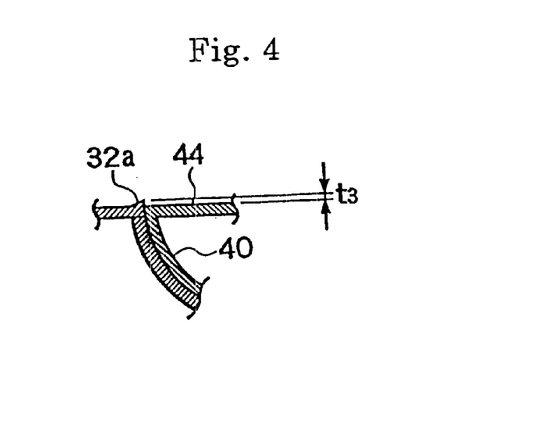
FIG. 4 is an enlarged view of the part B in FIG. 3.
Figure 5:
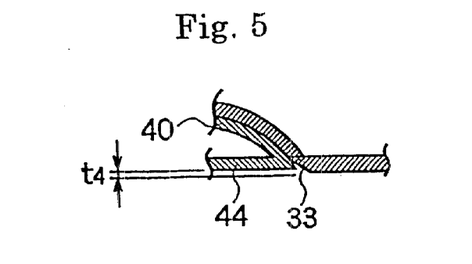
FIG. 5 is an enlarged view of the part C in FIG. 3.

A diameter-reducing slope 32a is formed on a circumferential surface of an inner wall of the introducing passage 32 toward the through passage 44 and an inside diameter of the introducing passage 32 at an output end thereof is set to be smaller than an inside diameter of the through passage 44 (refer to the size $t_3$ in FIG. 4). Consequently, a stepped part with which granular material may possibly collide is not formed in a moving direction of the granular material between the casing 38 and the valve disc 40 as shown in FIG. 4 and FIG. 5, which are fragmentary enlarged views of the changeover valve 28. Therefore, collision of the granular material with the stepped part, which is formed in a conventional changeover valve, does not occur. It is appropriate that an inclination angle of the diameter-reducing slope 32a is set at such an angle which does not cause the granular material to crush even when the granular material collides with the diameter-reducing slope 32a. For example, when polished rice is transported by air, it is appropriate to set the inclination angle of the diameter-reducing slope 32a at a value equal to 30 degrees or less in view of the later described result in FIG. 6. Setting the inclination angle of the diameter-reducing slope 32a in this way makes it possible to decrease a crushing rate of the granular material even when the granular material contacts the diameter-reducing slope 32a.

An arc-shaped corner part 33 is provided in each of input side parts of the first discharge passage 34 and the second discharge passage 35 to make each of the inside diameters of the discharge passages 34, 35 at input ends larger than the diameter of the through passage 44 so that no stepped part with which the granular material may possibly collide is formed (refer to the size $t_4$ in FIG. 5). This makes it possible to prevent the granular material from being crushed, similarly to the case when the granular material is transported from the introducing passage 32 to the through passage 44. Since no stepped part exists in the through passage 44, the granular material is capable of passing through the changeover valve 28 without any difficulty when it is introduced from the introducing passage 32 together with the gas stream.

The second discharge passage 35 is structured with a center axis 47 thereof being in a position to which the center axis 46 of the passage 44a is rotated by 30 degrees around a point A which is a point where the center axis 46 intersects with an outer circumference of the valve disc 40. In this formation of the second discharge passage 35, counterclockwise rotation of the valve disc 40 by 150 degrees causes the introducing passage 32 to be connected to the second discharge passage 35 to form the second passage 44b so that the granular material is discharged from the second discharge passage 35 via the second passage 44b when the granular material is introduced from the introducing passage 32 together with the gas stream. The structure described above also makes it possible to prevent the granular material from being crushed in the second passage 44b.

Figure 6:
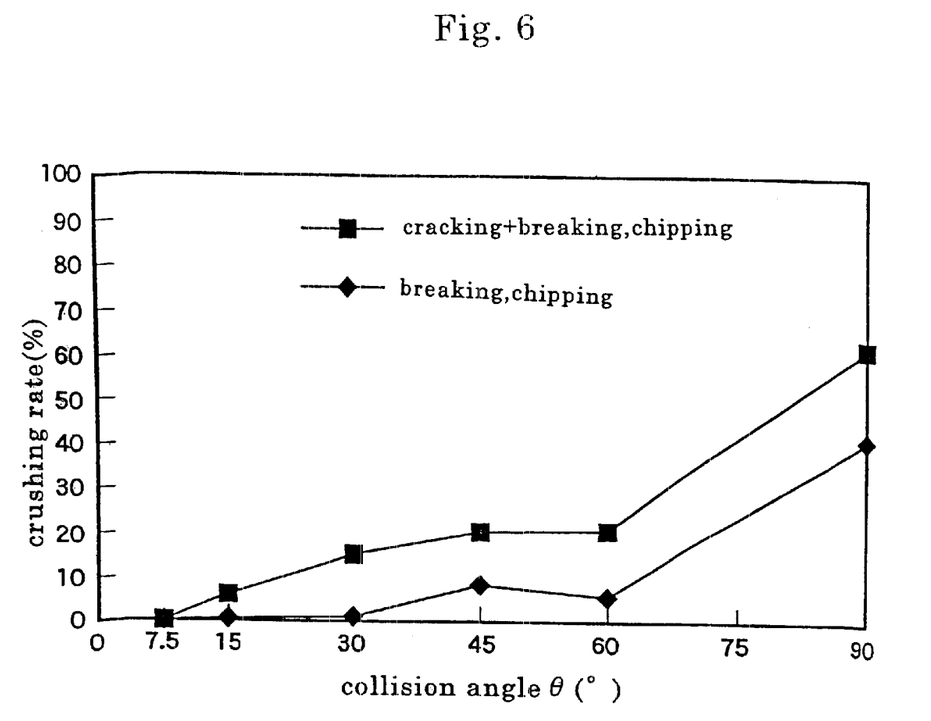
FIG. 6 is a graph showing a crushing rate of rice relative to a collision angle.
Figure 7:
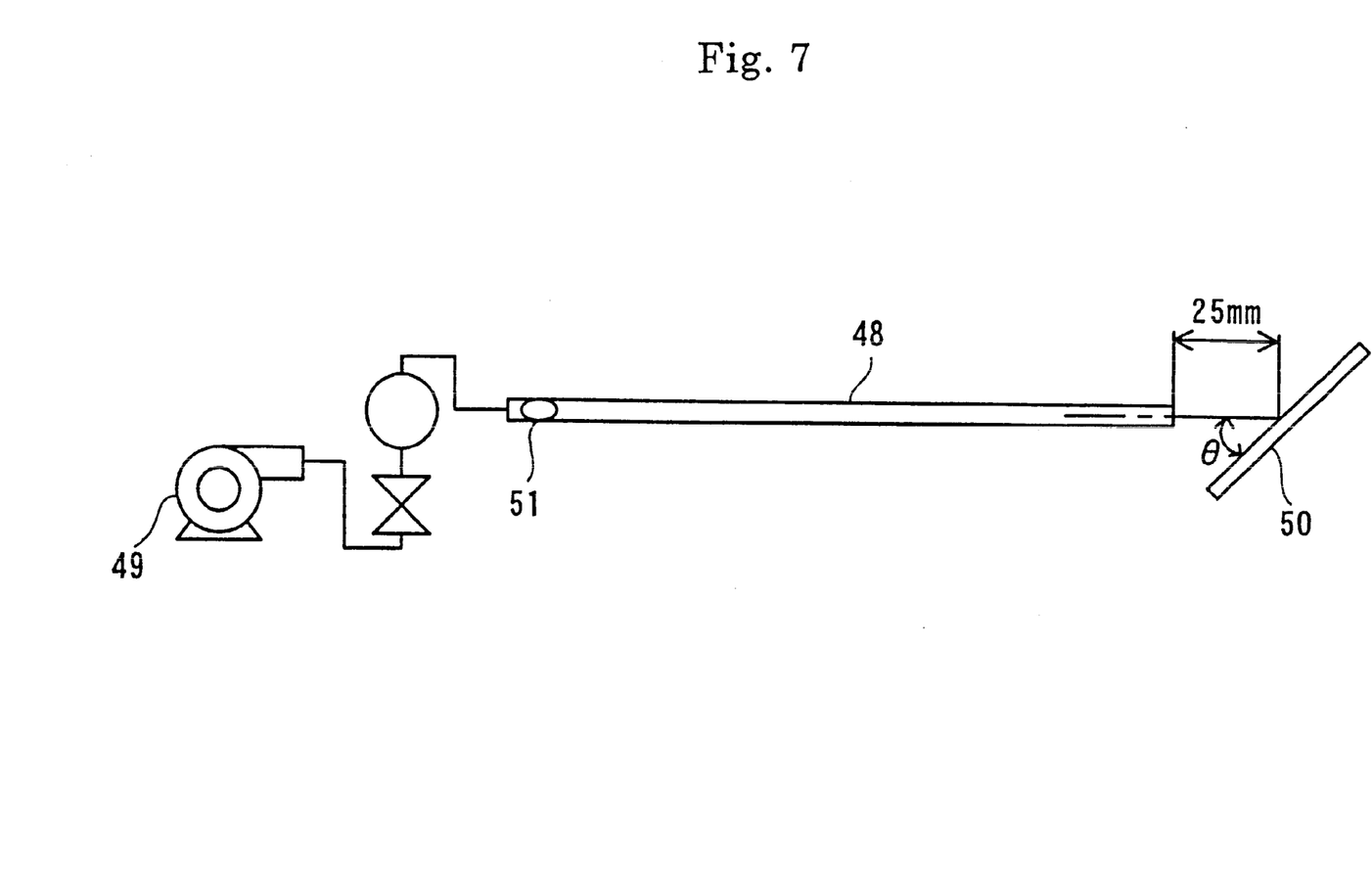
FIG. 7 is an explanatory block diagram of a transportation apparatus for grain.

The inventors of the present invention have obtained the following findings after repeated experiments on pneumatic transportation for rice. FIG. 6 shows the result obtained by the inventors of the present invention from the studies in which a collision angle θ at which the rice collides with a wall is varied to study a crushing rate of the rice. As is apparent from FIG. 6, the smaller the collision angle θ is, the lower the crushing rate is, and when the collision angle is 30 degrees or less, the possibility that breaking and chipping occur is low. Therefore, it has been found that some method needs to be utilized in places where the rice may possibly collide with the pipe wall inside the transportation pipe so that the rice collides with the pipe wall at an angle of 30 degrees or less. The experiment shown in FIG. 7 is conducted in the apparatus shown in FIG. 8 where an air-pump 49 is provided at one end of an acryl pipe 48 having a length of 1000 mm and a stainless plate 50 whose rotational center is on an axis center of the acryl pipe 48 and which is capable of adjusting adjust the collision angle θ is disposed at a distance of 25 mm from an exit of the other end of the acryl pipe 48. In the experiment shown in FIG. 6, each polished rice 51 is transported through the acryl pipe 48 by air generated by the air pump at 20 m/sec and the rice 51 is collided with the stainless plate 50.

The findings show that when polished rice is transported by air, an angle made by the first passage 44a and the second passage 44b is appropriately set at 30 degrees or less.

A preferred embodiment of a transportation apparatus for grain according to the present invention is explained in detail below.

FIG. 7 is an explanatory block diagram of a transportation apparatus for rice to which changeover valves 28 according to the present invention are applied. As shown in FIG. 7, the transportation apparatus 11 for rice to which the changeover valves 28 according to the present invention are applied has a structure in which several stages of transportation pipes for performing pneumatic transportation are serially connected. The transportation apparatus 11 shown in the drawing is structured to have two stages of the transportation pipes. A first transportation pipe 12 which constitutes the transportation apparatus 11 and is disposed on a preceding stage side has a blower 14 for sending air provided in a starting end part thereof and the blower 14 is operated to generate an air stream flowing toward an end side of the first transportation pipe 12 inside the first transportation pipe 12.

A plurality of first storage tanks 15, which are disposed along the first transportation pipe for rice immediately after the blower 14, for storing the rice therein are connected to the first transportation pipe 12 and the rice is supplied to the first transportation pipe 12 from the first storage tanks 15 so that the rice is transported toward the end side of the first transportation pipe 12. In an end part of the first transportation pipe 12, a rice polishing apparatus 16 is also provided to store the rice, which is transported by the first transportation pipe 12, in an accommodation tank 18 and to polish the rice which is stored in the accommodation tank 18. Incidentally, a polished rice supply port 22 for supplying the polished rice to a starting end side of a second transportation pipe 20 is provided in a bottom part of the rice polishing apparatus 16. Curvature of a passage of the first transportation pipe 12 up to the rice polishing apparatus 16 needs to be set at least at a value equal to 500 mmR or more (preferably, about 1000 mmR) to prevent the rice from colliding with an inner wall of the pipe at a steep angle.

The second transportation pipe 20, to which the polished rice supply port 22 is connected and which is disposed on a subsequent stage to the first transportation pipe 12, has a blower 24 for sending the air provided in a starting end part thereof, and the blower 24 is operated, similarly to the blower 14, to generate in the second transportation pipe 20 an air stream moving toward an end side of the second transportation pipe 20. In an end part of the second transportation pipe 20, a plurality of second storage tanks 26 for storing the polished rice therein are disposed along the second transportation pipe 20 and appropriate changeover operations of the changeover valves 28 which are disposed at branching points to the second storage tanks 26 enable the polished rice to be stored in an optional one of the second storage tanks 26.

Supply ports of the polished rice are formed in lower parts of the second storage tanks 26 to supply the rice to a transportation pipe on the next stage subsequent to the subsequent stage to the second transportation pipe 20.

A procedure for accommodating rice 41 in the second storage tanks 26 in the transportation apparatus 11 for rice using the changeover valves 28 as structured above is explained.

In FIG. 7, the blower 14 and the blower 24 are first operated to generate the air streams inside the first transportation pipe 12 and second transportation pipe 20 so that the rice 41 inside the pipes is transported by the air streams.

The rice 41 is supplied to the first transportation pipe 12 from an optional one of the first storage tanks 15 after the air streams are thus generated in the pipe 12 and 20. The rice 41 which is supplied to the first transportation pipe 12 is then temporarily stored in the accommodation tank 18 of the rice polishing apparatus 16 and supplied into the second transportation pipe 20 from the polished rice supply port 22 of the accommodation tank 18 after undergoing a rice polishing process.

The rice 41 which is supplied into the second transportation pipe 20 reaches the changeover valve 28. Note that a procedure for storing the rice 41 in a second storage tank 26c after the rice 41 is stored in a second storage tank 26b is explained in this embodiment.

Figure 8:
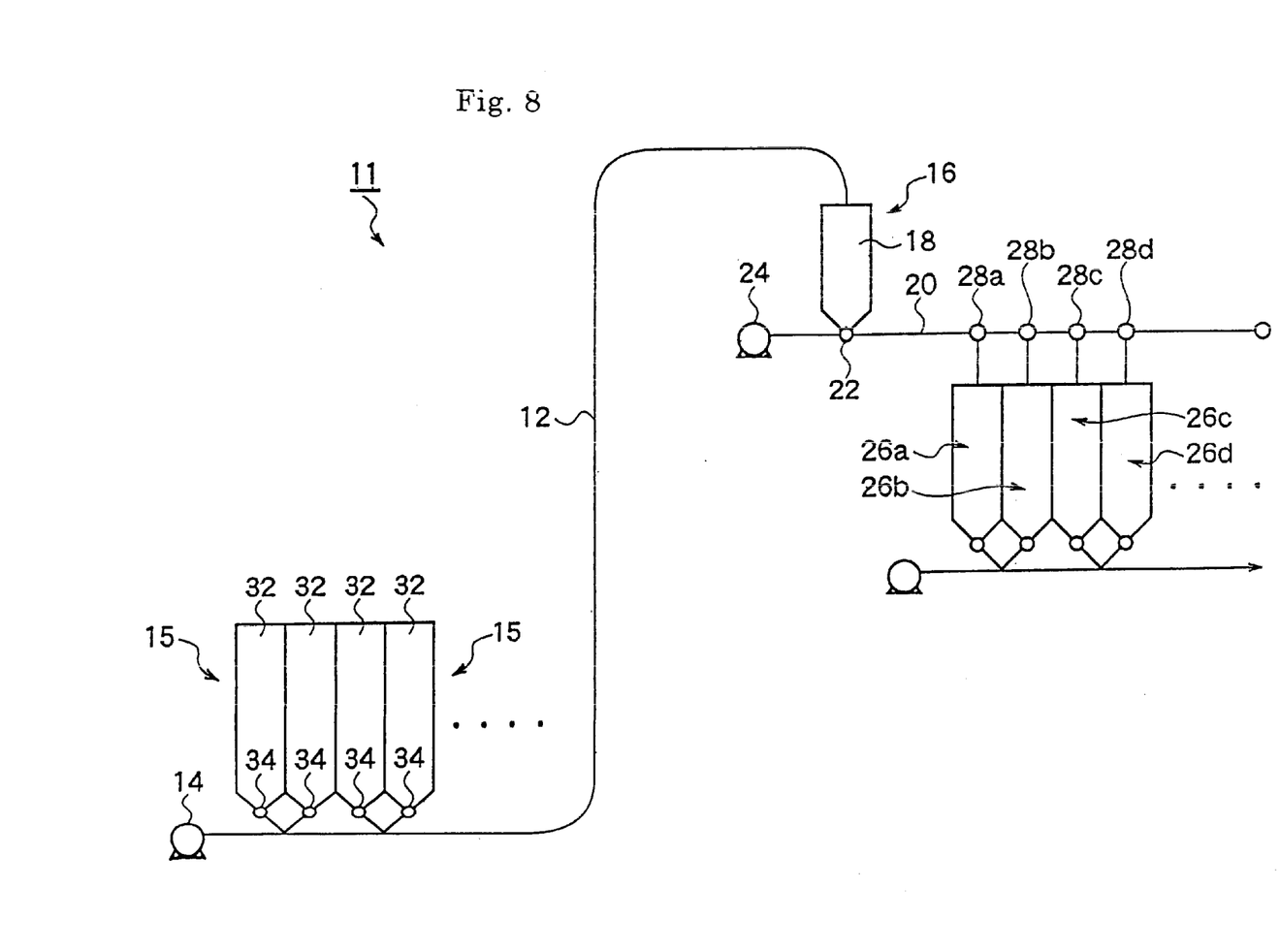
FIG. 8 schematically illustrates the apparatus of the experiment of FIG. 7.

FIG. 8 is an explanatory sectional view showing a procedure for changing over transportation passages for the rice 41 by the operations of the changeover valves 28. A changeover valve 28b is attached to the second storage tank 26b and a changeover valve 28c is attached to the second storage tank 26c as shown in FIG. 8.

A changeover valve 28a which is attached to a first storage tank 26a is first set to form the first passage 44a and the changeover valve 28b is set to form the second passage 44b in order to supply the rice 41 to the second storage tank 26b. Setting the individual changeover valves in this way causes the rice 41 which is transported from an upstream side along the second transportation pipe 20 to be moved to a downstream side along the first passage 44a when the rice 41 reaches the changeover valve 28a so that the rice 41 is prevented from moving toward the first storage tank 26a side. Since no stepped part is formed here, the rice 41 is prevented from being crushed when it passes the changeover valve 28a.

Thereafter, when the rice 41 which has passed the changeover valve 28a reaches the changeover valve 28b, all of the rice 41 which passes the second transportation pipe 20 is moved toward the second storage tank 26b side since the changeover valve 28b is set to form the second passage 44b. Incidentally, when the rice 41 is moved to the second storage tank 26b, it moves away from the second transportation pipe 20 and the first passage 44a which are linearly connected to each other so that an inclination occurs in the second passage 44b. However, this inclination angle is set at 30 degrees or less to make it possible to suppress the crush of the rice 41 to a minimum even when the rice 41 collides with the inner wall of the second passage 44b. The rice 41 is also prevented from being crushed in the changeover valve 28b when the rice 41 passes the changeover valve 28b in the same way as when it passes the changeover-valve 28a. This also applies to the changeover valve 28c.

Figure 9:
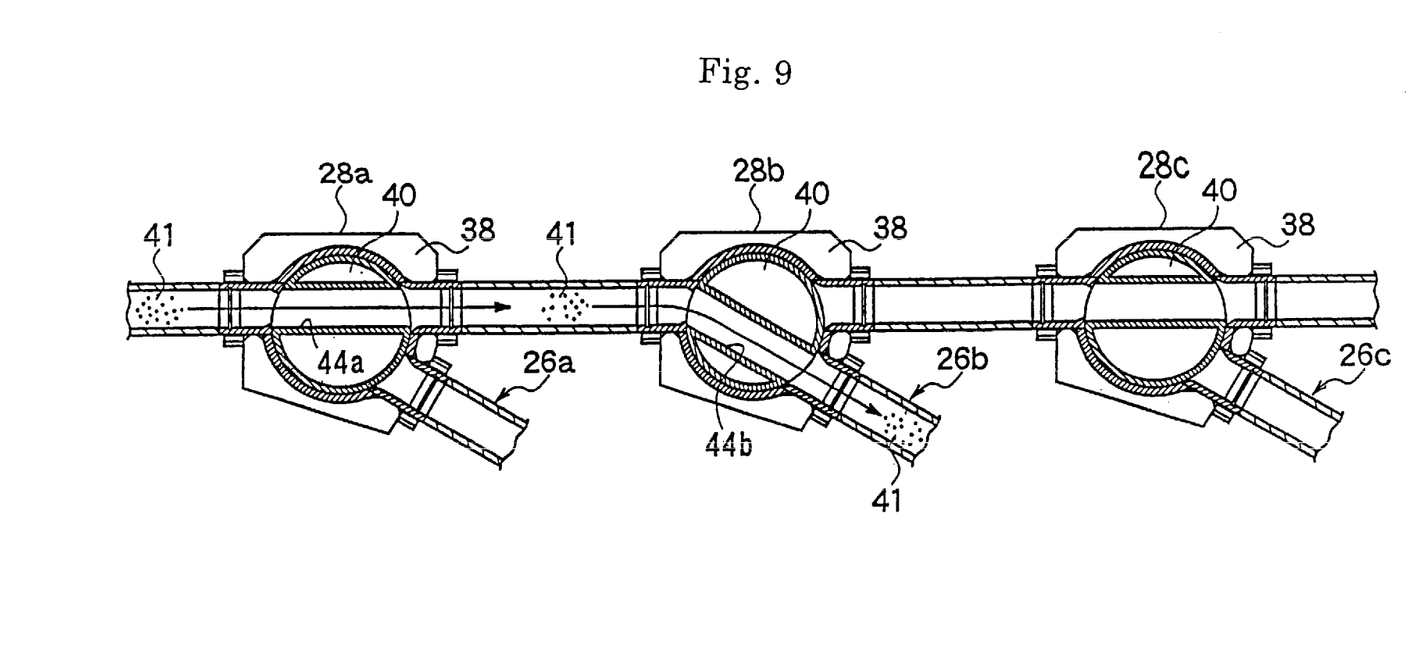
FIG. 9 is an explanatory sectional view showing a procedure for changing over transportation passages for rice by the changeover valves according to the present invention.
Figure 10:
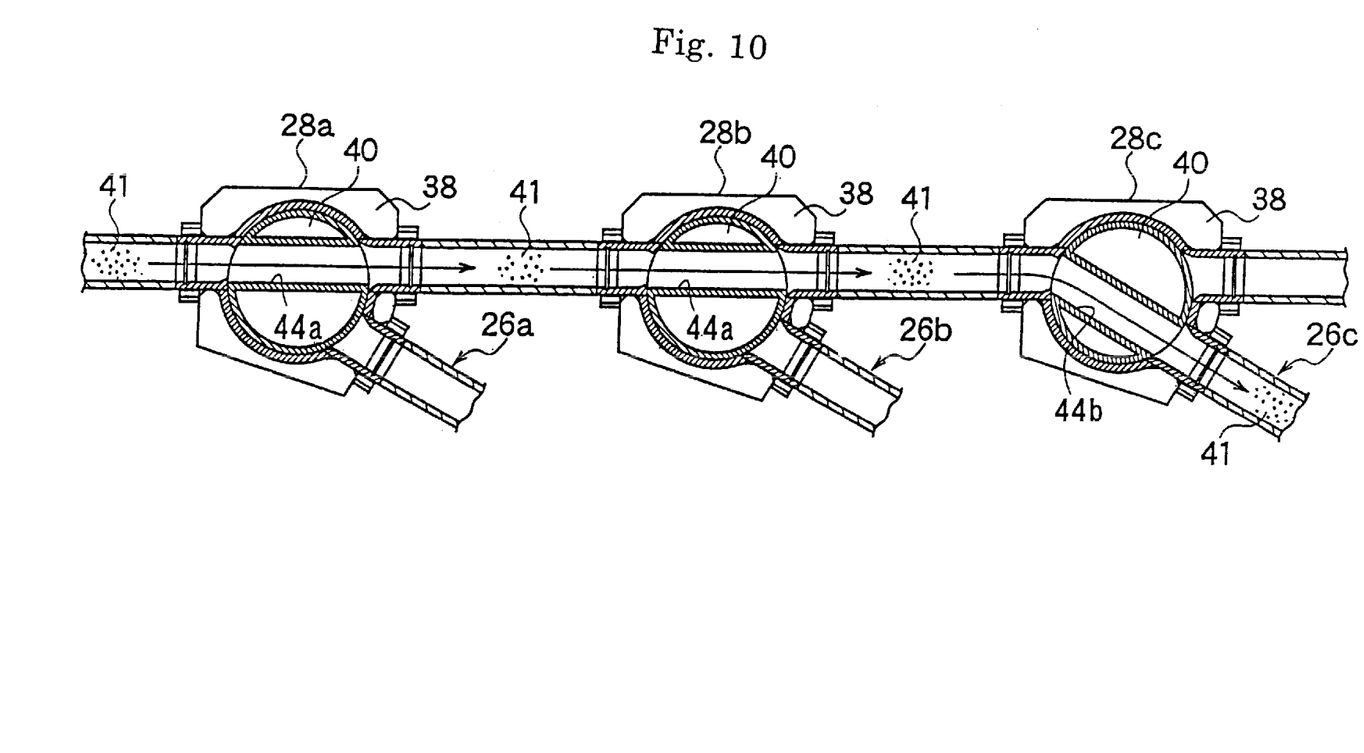
FIG. 10 is an explanatory sectional view showing a procedure for changing over transportation passages for rice by the changeover valves according to the present invention.

FIG. 9 shows states of each of the changeover valves when the rice 41 is to be stored in the second storage tank 26c. As shown in FIG. 9, when the rice 41 is to be stored in the second storage tank 26c, the valve disc 40 in the changeover valve 28b is rotated so that a passage to be used in the changeover valve 28b is changed over from the second passage 44b to the first passage 44a while a passage used in the changeover valve 28c is changed over from the first passage 44a to the second passage 44b. Incidentally, the changeover operation in the changeover valve 28c may be made in advance and the changeover operation in the changeover valve 28b may be made thereafter.

The changeover operations of the changeover valve 28b and the changeover valve 28c in this way makes it possible to change over tanks to be used for storing the rice 41 from the second storage tank 26b to the second storage tank 26c and when these changeover operations are made, the rice 41 can also be stored in the second storage tank 26c without being crushed.

According to the present invention, as described above, the crushing, cracking, breaking and chipping of the rice at the time it passes the changeover valves can be decreased to a great extent when the rice is transported by air through the pipe system.

Transportation of rice by air is explained in the above embodiment but the present invention is not limited to this embodiment and is applicable to transportation of other grain and granular material through the pipe system by gas.

What is claimed is:

1. A changeover valve, comprising:
   a valve disc in a cylinder shape including on a side part thereof a through passage which is connected to transportation passages on an upstream side and a downstream side and which is in an eccentric position deviated from a center of the cylinder;
   a casing for rotatably accommodating said valve disc therein; and
   a pair of discharge passages which are provided in said casing and connected to the through passage of said valve disc,
   wherein an inside diameter of an introducing passage of the changeover valve at an output end thereof is smaller than an inside diameter of the through passage of said valve disc and an inside diameter of the introducing passage in an output side part has a shape gradually decreasing in size toward the downstream side while an inside diameter of each of the pair of said discharge passages at an input end thereof is larger than the inside diameter of the through passage of said valve disc and an inside diameter of each of the pair of said discharge passages in an input side part has a shape gradually increasing in size toward the upstream side.

2. A changeover valve according to claim 1,
   wherein the shape of the inside diameter of the introducing passage in the output side part thereof, which is gradually decreasing in size toward the downstream side, is a slope.

3. A changeover valve according to claim 2,
   wherein the shape of the inside diameter of each of the pair of said discharge passages in the input side part thereof, which is increasing in size toward the upstream side, is in an arc shape.

4. A changeover valve according to claim 1,
   wherein the shape of the inside diameter of each of the pair of said discharge passages in the input side part thereof, which is increasing in size toward the upstream side, is in an arc shape.

5. A changeover valve, comprising:
   a valve disc in a cylinder shape including on a side part thereof a through passage which is connected to transportation passages on an upstream side and a downstream side and which is in an eccentric position deviated from a center of the cylinder;
   a casing for rotatably accommodating said valve disc therein; and
   a pair of discharge passages which are provided in said casing and connected to the through passage of said valve disc, wherein an inside diameter of an introducing passage of said changeover valve at an output end thereof is smaller than an inside diameter of the through passage of said valve disc and a diameter-reducing slope is formed in an output end part of the introducing passage with an inclination angle thereof equal to 30 degrees or less while an inside diameter of each of the pair of said discharge passages at an input end thereof is larger than the inside diameter of the through passage of said valve disc and an inside diameter of each of the pair of said discharge passages in an input side part has a shape gradually increasing in size toward the upstream side.

6. A changeover valve according to claim 5, wherein the shape of the inside diameter of each of said discharge passages in the input side part thereof, which is increasing in size toward the upstream side, is in an arc shape.

7. A gas transportation pipe system for grain, comprising:

a changeover valve comprising: a valve disc in a cylinder shape including on a side part thereof a through passage which is connected to transportation passages on an upstream side and a downstream side and which is in an eccentric position deviated from a center of the cylinder; a casing for rotatably accommodating said valve disc therein; and a pair of discharge passages which are provided in said casing and connected to the through passage of said valve disc, wherein said changeover valve is structured in a manner in which an inside diameter of an introducing passage of said changeover valve at an output end thereof is smaller than an inside diameter of the through passage of said valve disc and an inside diameter of the introducing passage in an output side part has a shape gradually decreasing in size toward the downstream side while an inside diameter of each of the pair of said discharge passages at an input end thereof is larger than the inside diameter of the through passage of said valve disc and an inside diameter of each of the pair of said discharge passages in an input side part has a shape gradually increasing in size toward the upstream side, and an angle which is made by center axes of the pair of said discharge passages is set at a value equal to 30 degrees or less, and wherein the through passage and an upper one of said discharge passages are coaxially connected to a main transportation pipe of the gas transportation pipe system for grain and a lower one of said discharge passages is connected to a branching pipe of the gas transportation pipe system for grain.

8. A gas transportation pipe system according to claim 7, wherein the shape of the inside diameter of the introducing passage in the output side part thereof, which is gradually decreasing in size toward the downstream side, is a slope.

9. A gas transportation pipe system according to claim 8, wherein an angle of the slope is 30 degrees or less.

10. A gas transportation pipe system according to claim 9, wherein the shape of the inside diameter of each of the pair of said discharge passages in the input side part thereof, which is increasing in size toward the upstream side, is in an arc shape.

11. A gas transportation pipe system according to claim 8, wherein the shape of the inside diameter of each of the pair of said discharge passages in the input side part thereof, which is increasing in size toward the upstream side, is in an arc shape.

\* \* \* \* \*